US006474926B2

(12) United States Patent
Weiss

(10) Patent No.: US 6,474,926 B2
(45) Date of Patent: Nov. 5, 2002

(54) SELF-ERECTING MOBILE CONCRETE BATCH PLANT

(75) Inventor: James E. Weiss, Germantown, WI (US)

(73) Assignee: Rose Industries, Inc., Milwaukee, WI (US)

(*) Notice: Subject to any disclaimer, the term of this patent is extended or adjusted under 35 U.S.C. 154(b) by 0 days.

(21) Appl. No.: 09/819,839

(22) Filed: Mar. 28, 2001

(65) Prior Publication Data

US 2002/0141851 A1 Oct. 3, 2002

(51) Int. Cl.$^7$ .......... B65G 69/00

(52) U.S. Cl. .......... 414/332; 414/919

(58) Field of Search .......... 414/21, 332, 919, 414/340, 354, 573

(56) References Cited

U.S. PATENT DOCUMENTS 3,064,832 A 11/1962 Heltzel
3,151,849 A 10/1964 Maxon, Jr.
3,154,202 A 10/1964 Helzel
3,251,484 A 5/1966 De P. Hagan
3,295,698 A 1/1967 Ross et al.
3,343,688 A 9/1967 Ross
3,448,866 A 6/1969 Perry et al.
3,458,177 A * 7/1969 Farnham et al.
3,820,762 A 6/1974 Bostrom et al.
3,872,980 A 3/1975 Hagan
3,938,673 A 2/1976 Perry, Jr.
3,998,436 A 12/1976 Allen et al.
4,178,117 A 12/1979 Brugler
4,187,047 A * 2/1980 Squifflet, Sr. .......... 414/332
4,253,256 A 3/1981 Feliz
4,337,014 A * 6/1982 Farnham .......... 414/332
4,348,146 A 9/1982 Brock
4,561,821 A 12/1985 Dillman
4,579,496 A 4/1986 Gerlach
4,619,531 A 10/1986 Dunstan
4,775,275 A 10/1988 Perry
4,943,200 A * 7/1990 Edwards et al. .......... 414/332
4,944,646 A * 7/1990 Edwards et al. .......... 414/332
5,171,121 A 12/1992 Smith et al.
5,362,193 A 11/1994 Milstead
5,411,329 A * 5/1995 Perry .......... 366/26
5,667,298 A 9/1997 Musil et al.

FOREIGN PATENT DOCUMENTS

FR 1370103 7/1964
FR 2554759 5/1985
GB 336152 10/1930
GB 924064 4/1963
IT 724081 11/1966

OTHER PUBLICATIONS

Bulletin No. 1150–569, 19 pages, Title: "Model S Batch Plant", Rexcon, Division of Rose Industries, INc., Date unknown.

* cited by examiner

*Primary Examiner*—James W. Keenan
(74) *Attorney, Agent, or Firm*—Ryan Kromholz & Manion, S.C.

(57) ABSTRACT

A roadway transportable concrete batching plant including a mobile supporting base unit, a mobile, self-erecting, batching tower unit and a mobile mixer unit, and further including an outrigger supporting system providing lateral support during onsite installation and operation of each of the cooperating batching plant units.

8 Claims, 11 Drawing Sheets

SELF-ERECTING MOBILE CONCRETE BATCH PLANT

BACKGROUND OF THE INVENTION

The present invention relates generally to mobile concrete batching plants and more particularly to an improved mobile concrete batching and mixing plant comprising multiple units capable of self-erecting assembly on the job site.

Concrete is widely used as a building material and can be brought to a job-site in numerous ways. One of the most common methods is to purchase the concrete from a central ready-mix station, wherein the raw ingredients are placed in a mixing truck and mixed while in transit. Such a system works well and is cost effective when the job site is fairly close to the ready-mix station. However, problems arise when the final location is remote from material storage facilities.

Concrete must be mixed and typically be placed in its final form within an optimum time period. This time period is dependent upon the time of travel from the plant site to the ultimate use location and may vary greatly, depending upon conditions which may be completely out of the control of the operator of the vehicle transporting a desired mix, such as snarled traffic conditions, vehicle breakdown, and the like. Further, material mix ratios calculated for desired hardness of the finished product require differing times for setup and curing to obtain a desired finished hardness. For instance, if over-mixed, excess air becomes entrained in the concrete and will lower the hardened strength. If allowed to sit, the concrete will begin to cure before it is dumped and formed. Additionally, a long hauling distance will translate into high transportation costs.

In construction projects that require a large volume of concrete to be delivered to remote locations, the use of a mobile batch plant is cost effective. A mobile plant typically has many of the same components as a central ready-mix plant, but on a reduced scale. Early mobile plants comprised a number of individual components that were towed to the job site by truck and assembled on location. Such plants could include a mixer unit, thereby eliminating the need to use mixing trucks and allowing the use of more economical flatbed, dump trucks.

A major expense with early mobile plants was the requirement of a crane for assembly on the job site. Cranes were often utilized during assembly and disassembly, but would sit unused for long periods of time in the interim. In response to this problem, self-erecting batch plants were designed.

Early one-piece self-erecting batch plants were limited in their ability to produce large volumes of concrete. Because the entire batch plant was contained within a single unit, the size of the unit was limited to certain maximum road-going weights and dimensions. This also limited the size of the storage bins contained within the unit for aggregate, water and cement.

Another factor to be considered, and often somewhat neglected in design configuration of the unit or units needed to transport a remotely located batching facility, is the consideration of variations in supporting terrain. Obviously, there are very few problems when the terrain is level, as in the case of a surveyed and properly graded area, but this is usually the exceptional case at remotely located sites. The usual new location for road construction is usually unleveled, and may even range from soft, sandy to rocky, and in which variations in ground condition may occur with only a few feet from one another.

A mobile batch plant comprised of multiple units allows for larger volumes of concrete constituents to be initially transported to the job site, and therefore, more concrete to be produced. Each separate unit may be designed and built to maximum weight and dimensions of an entire one-piece prior art batch plant. Providing multiple, individual tractor-trailer rigs allows for a larger batch plant with greater output capacity to safely be transported to the job site.

As stated previously, problems with designing a multiple unit, self-erecting plant has been finding a configuration that would allow stability of the cement tower and a mixing unit during location and erection and use. It is also often desirable to position the cement tower over a conveyor, requiring even increased height. Accordingly, there is a need for a large capacity, self-erecting, mobile concrete batching and mixing plant that utilizes a self-contained stabilizing system that may be transported with one or more components or transporting units, and which may be facilely and quickly assembled along with the self-erecting procedures required during assembly and operation of the cooperating cement tower unit, aggregate transport and supply unit and a mixing unit each of which is attached and conjointly supporting one another.

SUMMARY OF THE INVENTION

The present invention is directed to a self-erecting mobile concrete batch plant, wherein three separately transported units may be assembled in the field to become a complete concrete mixing and dispensing station. Each unit comprises a separate trailer, brought to the job site by a semi tractor. The base unit preferably houses and supports aggregate bins, an aggregate conveyor, a large capacity water storage tank and hydraulic and pneumatic motors used to provide power during self-erection and normal operation. The second unit houses and supports the cement batching tower and contains a cement storage bin, a water holding tank and the cement batcher. The third unit contains a mixer, a hydraulically operated tilt pack for the mixer, and an optional dust collection system. All units receive hydraulic power during erection and pneumatic power during operation from the base unit via quick disconnect hoses.

The erection process begins by first locating and positioning the base unit, thereby determining where the finished batch plant will stand, and where the mixed concrete will eventually be dispensed. The base unit is raised off its wheels and leveled and supported by foot pads or plates located at the distal ends of a plurality of hydraulically-operated, extendible support legs. When the base unit reaches the required elevation, hinged outrigger support braces are preferably pivotally moved outwardly to allow placement of the cement tower and lateral support of the base unit during and after erection of the tower unit. The support braces also include hydraulically operated, extendible support legs which will eventually support the cement tower from below.

Next, the cement tower, or silo, trailer unit, with the tower being supported in its prone or supine position on the trailer, is backed into position towards the rear of the previously elevated base unit, and with a bottom portion of the tower extending rearwardly from the end of the trailer until the tower bottom portion abuts the rear of the base unit. Apertured pivot pin supporting clevis members extending from the tower align with corresponding apertured supporting clevis members on the base unit. Pivot pins are placed through the apertures, connecting the two units and forming hinged connections that become the main pivot points for the cement tower during erection. Hydraulically operated, linear actuators, conventionally known as “rams”, are anchored to the framework of the tower unit and have the free ends of their respective plungers pivotally anchored supporting clevis members extending from the base unit. The linear actuators are operated to pivotally raise the cement tower to its erect operating position.

The tower rams extend until the tower rotates slightly past the vertical axis. The hinged outrigger support braces are then rotated on their hinges, or pivots, to allow the braces to swing into supporting position beneath the cement tower, or silo. The hydraulically operated legs on the outswung outrigger support braces are then extended to their final location, preferably perpendicular to the base and tower units to aid in supporting the tower from below. The tower's linear actuators, or rams are then contracted until the tower, or silo, is completely supported by the base unit. The pins are removed from the connection between the linear actuators and the base unit, and the actuators are placed in resting storage positions. The cement batching tower's removable wheel assembly, left on the ground as the tower was raised, may be moved into storage. The base unit and cement tower are now in their respective final positions. The preferred embodiment of the novel concept utilizes a hinged extension outrigger supporting brace, which may be pivotally moved to provide an articulated, L-shaped brace configuration, with a first portion of the respective braces being directly pivotally supported by the hinge connection with the connected tower and base units, and extending angularly outwardly therefrom, and with the distally extending brace member being pivotally moved relative to a first portion and substantially parallel with the longitudinal plane of the base unit. The final location of each of said braces being dependent upon the supporting elevation of the supporting terrain lying below the respective feet of the brace portions.

The supporting mixer unit may now be positioned longitudinally behind the base unit and cement tower. The mixer unit is not physically connected to the other units, but receives hydraulic power from the base unit during erection. A detachable mixer nose cone, removed for transport, is installed on the mixing drum. Hydraulically operated support legs extend, to raise the mixer unit, and thereby position the mixing drum, which receives and mixes cement paste, aggregate, and admixtures from the other units during operation.

Aggregate storage bins on the base unit hold coarse and fine aggregate, which is delivered to the mixer by the conveyor. The weight of the aggregate is measured by decumulation from the storage bins, as opposed to traditional methods that require a separate aggregate batcher. Cement from the cement bin and water from the holding tank are gravity fed into the cement batcher and mixed into cement paste. The paste is then delivered to the mixer, along with any aggregate admixture from the admixture storage tank. All materials are placed into the rear of the mixer and are initially mixed in the horizontal position.

When the concrete is adequately mixed, the mixer's stand-alone hydraulic pack tilts the mixer. The concrete is dispensed through the nose cone into a mixing or dump truck for transportation to the final location.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Figure 1:
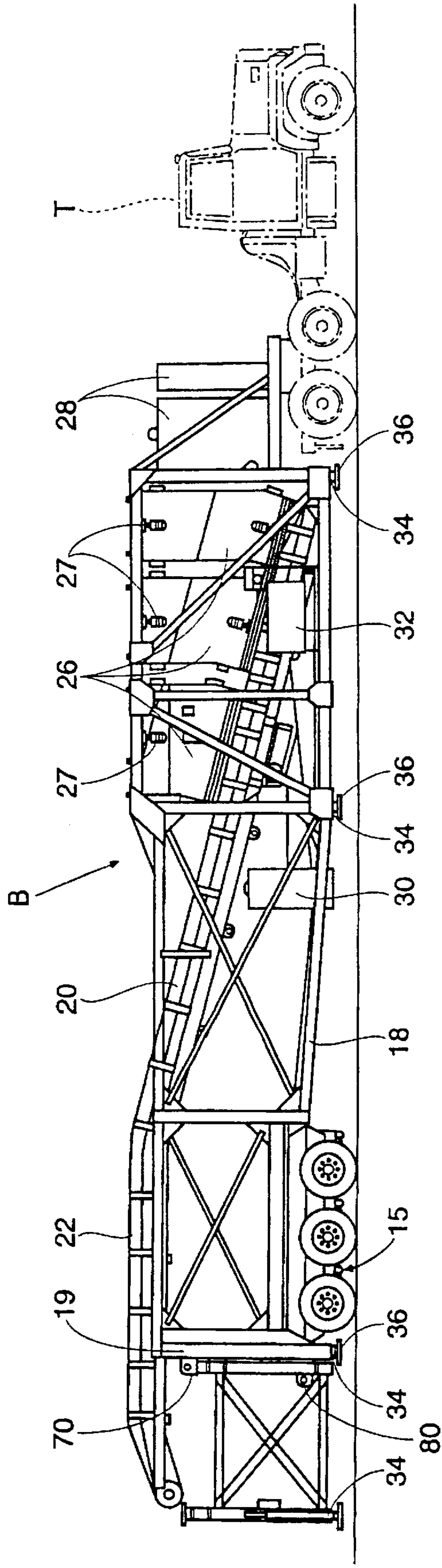
FIG. 1 is a side elevational view of a portable tractor-trailer rig (the tractor being shown in phantom) arranged to support and to transport a base unit for supporting a self-erecting cement tower, or silo, at a pre-selected location, and further being arranged to support and transport aggregate storage bins, and a conveyor for transporting the aggregate to the cement tower after erection of the tower and during batching operation thereof.
Figure 2:
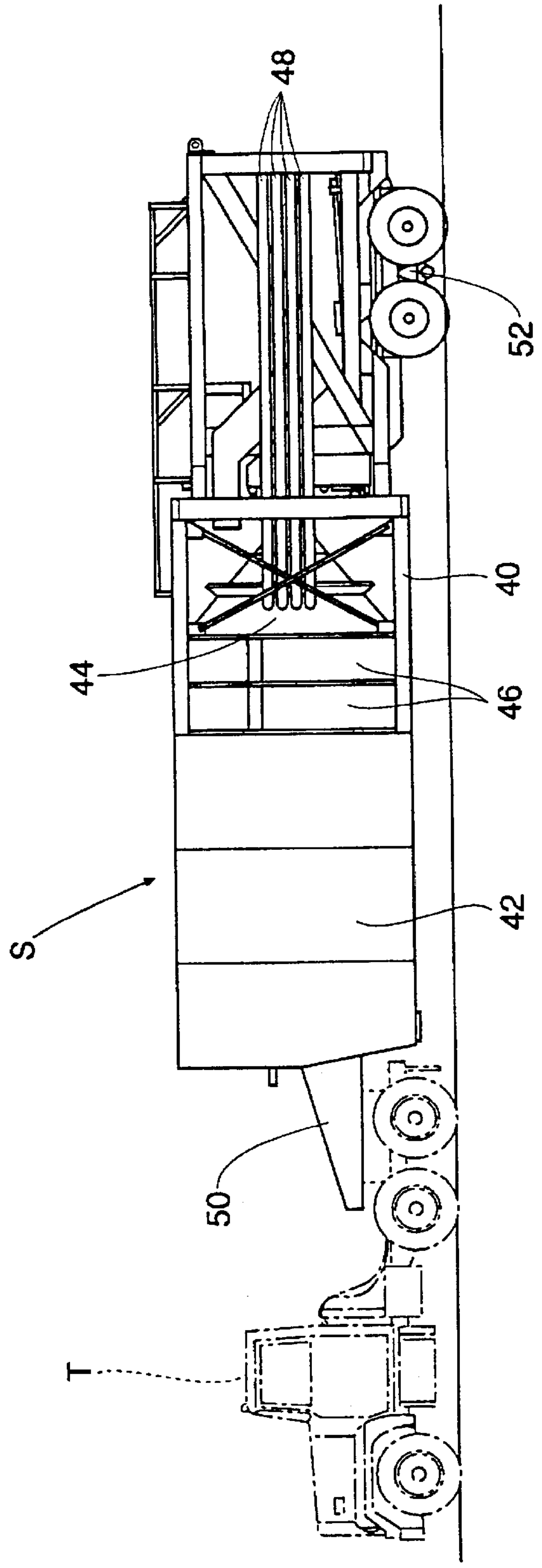
FIG. 2 is a side elevational view of a portable tractor-trailer rig (the tractor being shown in phantom) according to the present invention and arranged to support and to transport a cement batch plant tower, or silo, depicted in transportable prone or supine position, prior to self-erection on site at a pre-selected operating location.
Figure 3:
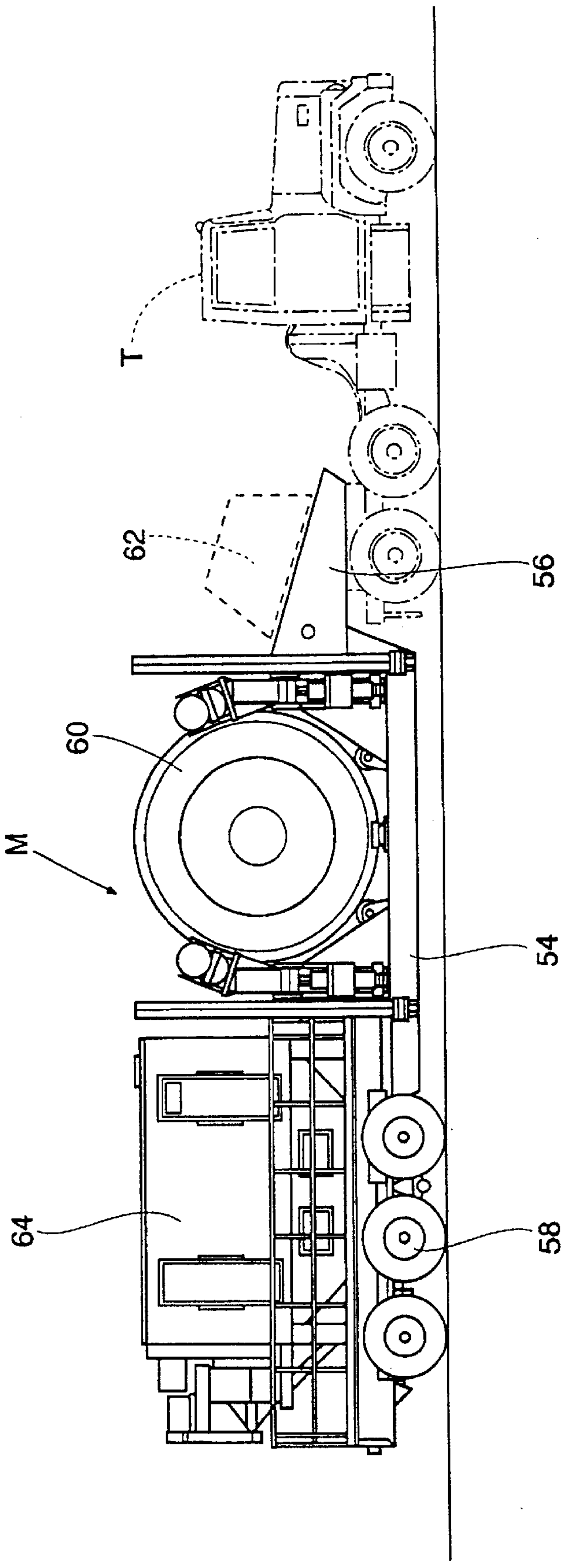
FIG. 3 is a side elevational view of a portable tractor-trailer rig (the tractor being shown in phantom) according to the present invention and supporting a mixer unit and an optional dust collection system.

Referring to the drawings in detail, and in particular to FIGS. 1–3, inclusive, the self-erecting concrete batch plant of this invention preferably comprises cooperating articulated units, identified herein by general characters, wherein B (FIG. 1), refers to a mobile supporting base unit, S (FIG. 2) refers to a mobile cement batching tower, or silo unit, and M (FIG. 3) refers to a mobile mixer unit. The units B, S and M are adapted for roadway transport by means of separate tractor units, shown in phantom in each figure and denoted by the reference character T.

Like reference characters are used throughout this description to designate like elements.

With reference to FIG. 1, it will be observed that the base-supporting unit B includes a separate rear wheel assembly 15 fastened to and supporting the rear end of a supporting trailer rig main frame 18. The frame 18 is arranged to pivotally support an end of a flexible, endless belt conveyor 20. The conveyor 20 is shown in rest position during roadway transportation and prior to operation, as will later be described. During rest, or transport position, the rearward extending distal end portion 22 of the conveyor 20 is preferably supported by one or more uppermost cross beams 24 (see FIG. 9) secured to oppositely disposed longitudinal beams 19 of the frame 18. The frame 18 of the supporting base unit B also houses a required number of aggregate bins 26, a water tank 28 and hydraulic and pneumatic motor or drive units 30,32. The individual aggregate bins 26 are each suspended from spring scales 27, as will later be described. The frame 18 includes a plurality of individually, hydraulically operated, extendible support legs 34 located on opposite sides of the frame 18. Each of the legs 34 includes a foot pad, or plate 36, which may be pivotally attached to the distal end of its respective leg 34.

Referring next to the view of FIG. 2, it will be observed that the batching or silo unit S preferably comprises a supporting frame 40 shown in its supine transportable position, and including a cement bin 42, cement batcher 44 water holding tanks 46, and a series of sand and aggregate transporting tubes 48 for supplying the cement batcher 44. As previously mentioned, the silo unit S may be transported to an operating site by means of a "fifth wheel" hitch mechanism 50 attached to a tractor T. It is preferred to removably attach a wheel assembly 52 to the frame 40 for transportation and later removal for unencumbered erection and operation of the silo unit S, as will later be described.

The separate mixer unit M, as illustrated in the view of FIG. 3, comprises a supporting frame 54 including a hitch mechanism 56 at its forward end and a wheel assembly 58 for roadway transport. The frame 54 is preferably designed to support a rotatable mixer 60, the mixer's detachable nose cone 62, and an optional, self-contained, dust collection system 64.

Each of the units B, S, and M receive hydraulic power during erection and pneumatic power during operation from the respective motor or drive units 30,32 located in the base unit B, via quick disconnect hoses (not shown). The hoses and necessary fittings have been intentionally omitted from the drawings to simplify understanding of the drawings and the various cooperating elements of the invention. Connections, hoses and fittings are conventional and readily available.

Plant Assembly Procedure

The present invention contemplates utilizing both the base unit B and the silo unit S working in conjunction to provide the onsite, self-erection and operation of the batching or silo unit S. The mixer unit M may provide added stability, if so desired. It is further contemplated to provide an additional stability system for the relative high tower, especially when erected on uneven terrain. Using the foldable outrigger arrangement, of this invention, carried by the mobile base support unit B, provides this additional stability.

Figure 4B:
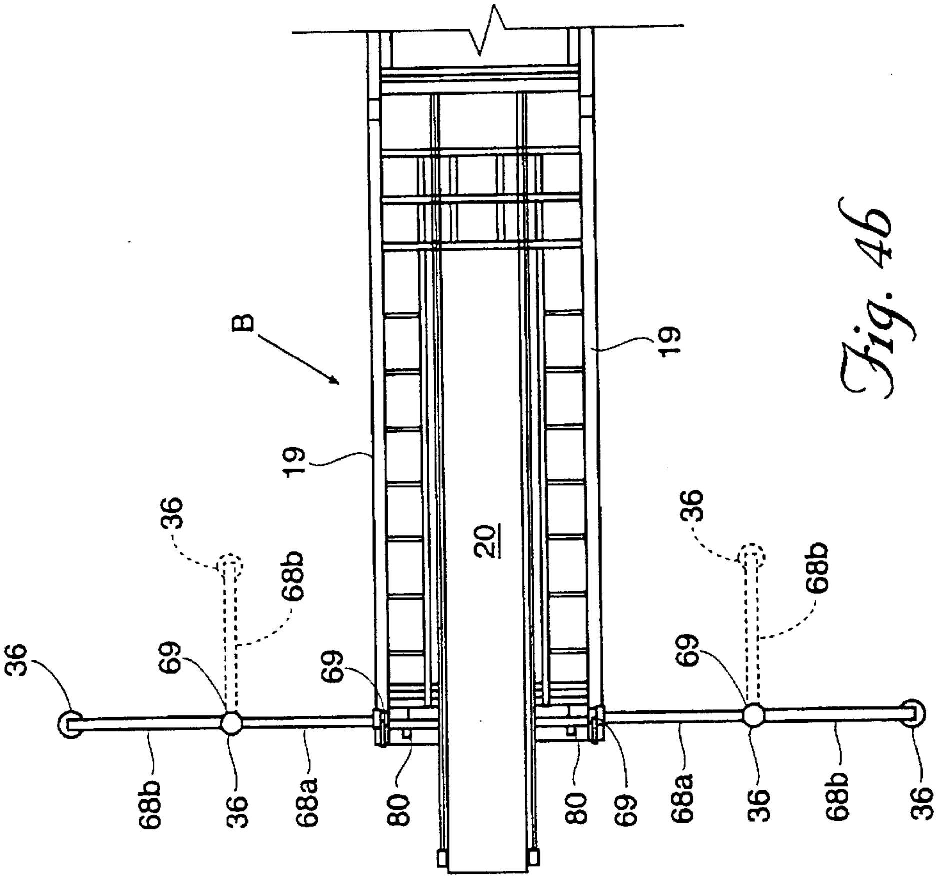
FIG. 4*b* is a fragmentary top view of the rear portion (with respect to the view of FIG. 1) of the rig supporting the base unit, and illustrating the outrigger braces in made in accordance with the present invention, and extending substantially perpendicular to the longitudinal plane of this rig.
Figure 9:
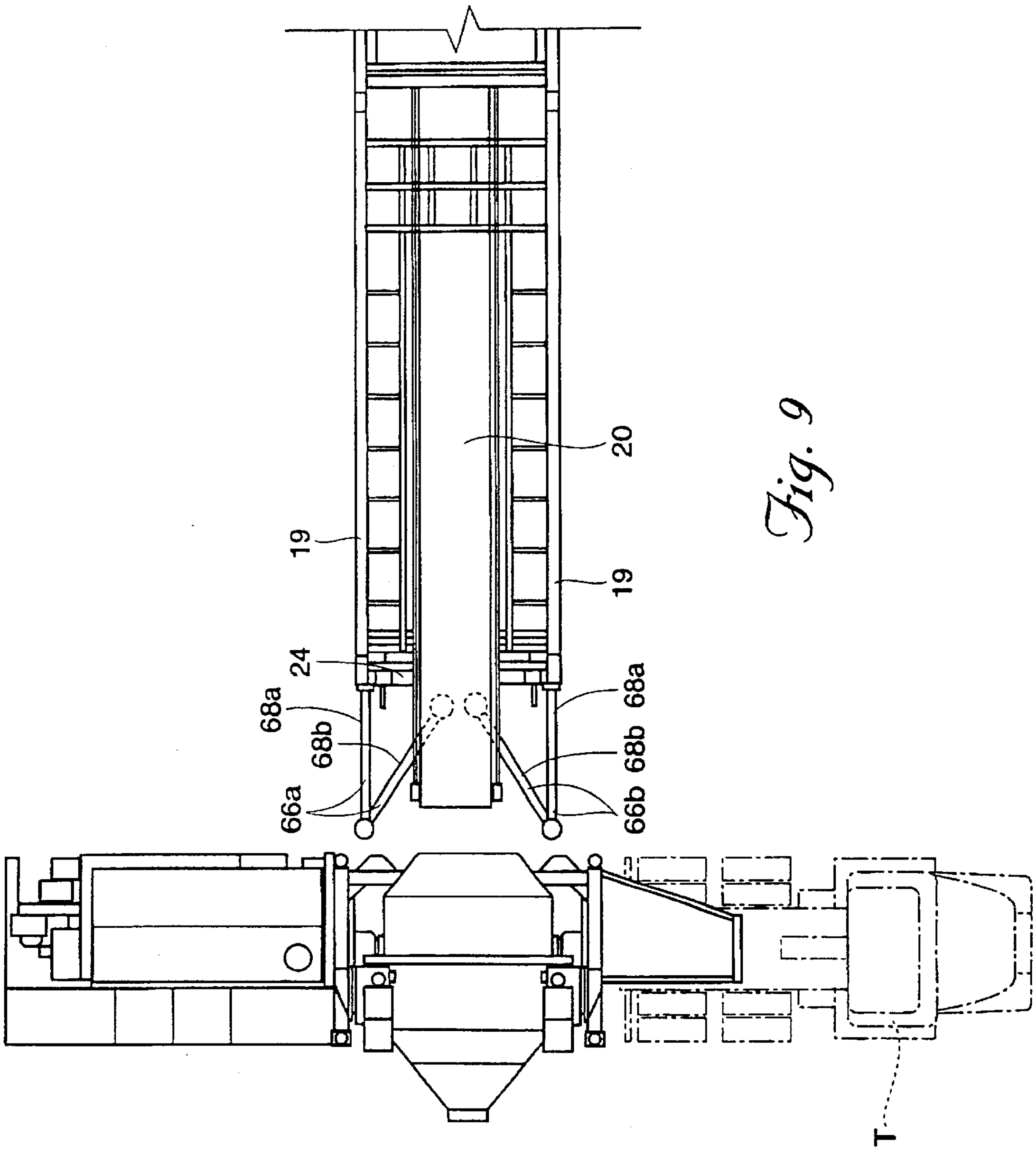
FIG. 9 is a top plan view of the relative operating positions of the mixer unit and the base unit, with the tower being removed for clarification purposes.
Figure 10:
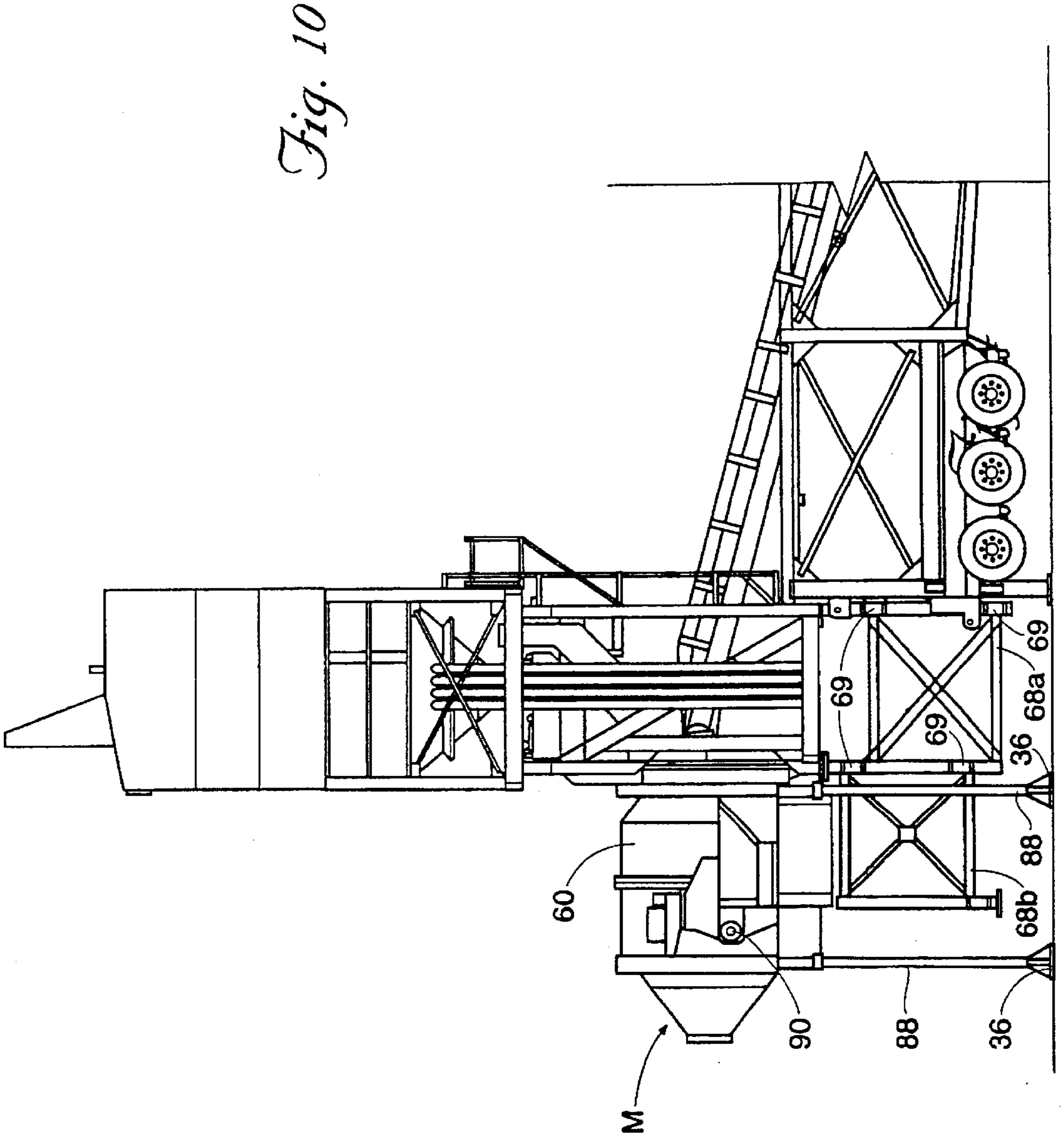
FIGS. 10 and 11 are fragmentary side elevational views of the final assembly of the cooperating units of this invention.
Figure 11:
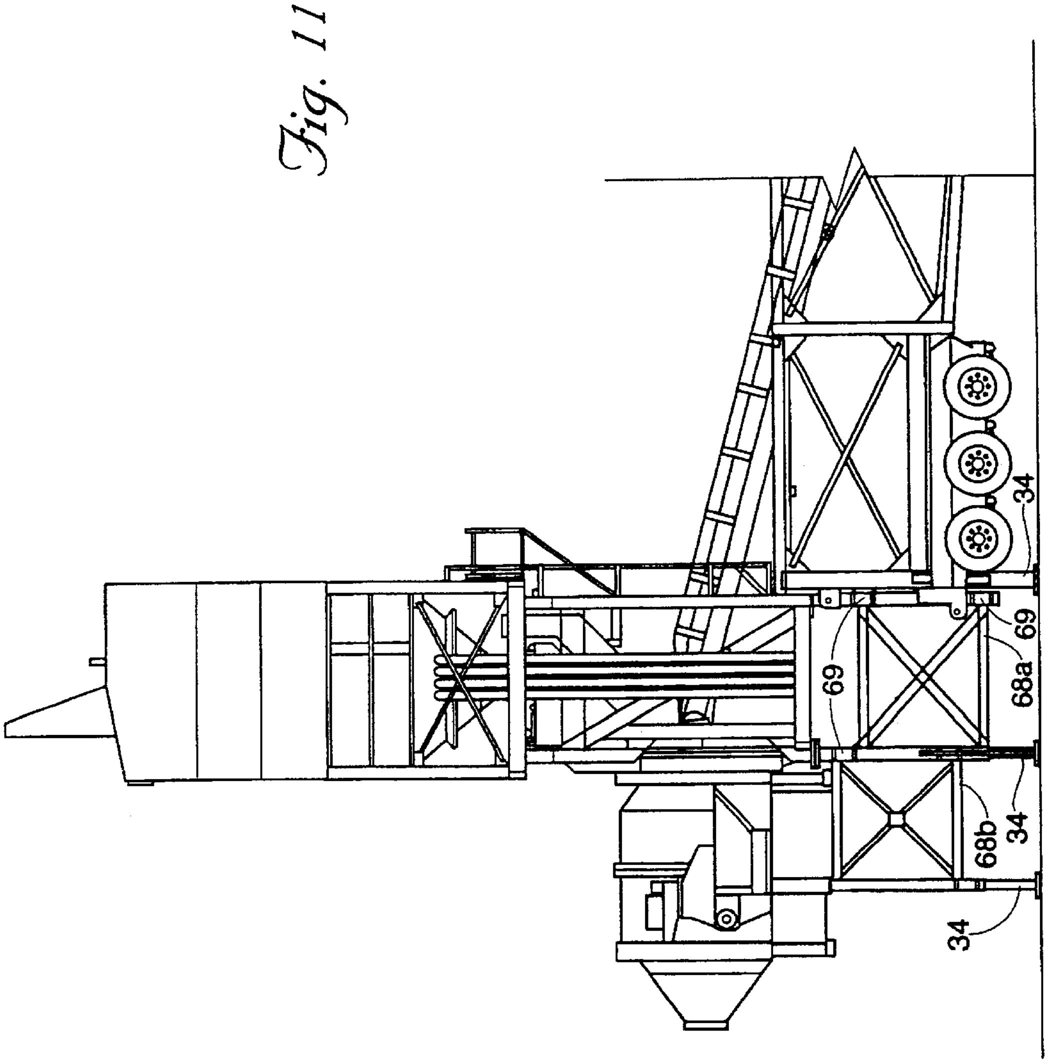

With reference to FIGS. 1, 4*b* and 9, it will be observed that the supporting base unit B carries, at its rear end a pair of hinged outrigger sub-assemblies 66*a* and 66*b*. Each outrigger subassembly 66*a* and 66*b* is composed of substantially identical, hinged "X" brace members 68 normally folded inwardly relative to one another and flat against the rear of the unit B. (not specifically shown.) It is preferred to first maneuver the supporting base unit B onto a pre-selected working location. Obviously, it would be most desirable if this location was on flat, level terrain. However, it is rare that the usual terrain would provide this feature. Accordingly, the present invention contemplates the use of individual hydraulically extensible support legs 34 on both the chassis, or frame 18 of the base support unit B and the outrigger subassemblies 66*a* and 66*b* comprised of "X" braces 68*a* and 68*b*. Footpads 36 are preferably pivotally mounted on the distal ends of each leg 34 to provide additional stability.

The base support unit B is transported and parked at a desired batching location. Next, the base support unit B is elevated and leveled to the height position shown in the views of FIGS. 5–11, inclusive, by hydraulically extending its support legs 34. In contemplation of next locating and erecting the batching or silo unit S, and as illustrated the view of FIG. 4*b*, the outrigger subassemblies 66*a* and 66*b* are hingedly moved laterally outwardly of the supporting base unit B. The respective support legs 34 of each of the X braces 68*a* and 68*b* are then hydraulically extended to provide lateral support to the support base unit B and during self-erection of the silo unit S. As shown in phantom, the outrigger subassemblies 66*a* and 66*b* may have their respective outermost X braces 68 folded inwardly to be parallel, or otherwise angularly relative to the longitudinal plane of the unit B, depending upon elevation and location of the chosen terrain. It will be observed that the use of the two-piece subassemblies 66*a* and 66*b* with individual support legs 34 and pivoted footpads 36 provides a large number of variations to insure desired stability of the assembling and assembled units B and S to accommodate most variables in contour and elevation of the terrain.

As heretofore stated, the present invention contemplates self-erection of the cement batching tower, or silo unit S to thereby eliminate the need of a crane or other conventional lifting device. This is readily accomplished in conjunction with the adjoining supporting base unit B. The base unit B, when previously located and stabilized, serves as a relatively immovable object to brace the pivotally attached silo unit S. This pivotal attachment may be seen in the enlarged view of FIG. 5*a*, wherein the base unit B is provided with a pair of rearwardly projecting clevis members 70 each including coaxial apertures for receiving a driven pivot pin 74. A supporting pivot member 72 extends from the rear of the silo unit S, and is supported by the pivot pin 74. As shown in the view of FIG. 6, the tower or silo unit S is rotated on the pivot pin 72 in the direction of the arrow 76. This rotative lifting motion is accomplished by means of a pair of spaced apart, hydraulically extensible rams 78, which are each pivotally attached, via pivot pins 82, to stationary clevis members 80 (see FIG. 5*b*), which extend rearwardly from opposite frame members 19 of the supporting base unit B.

Figure 7:
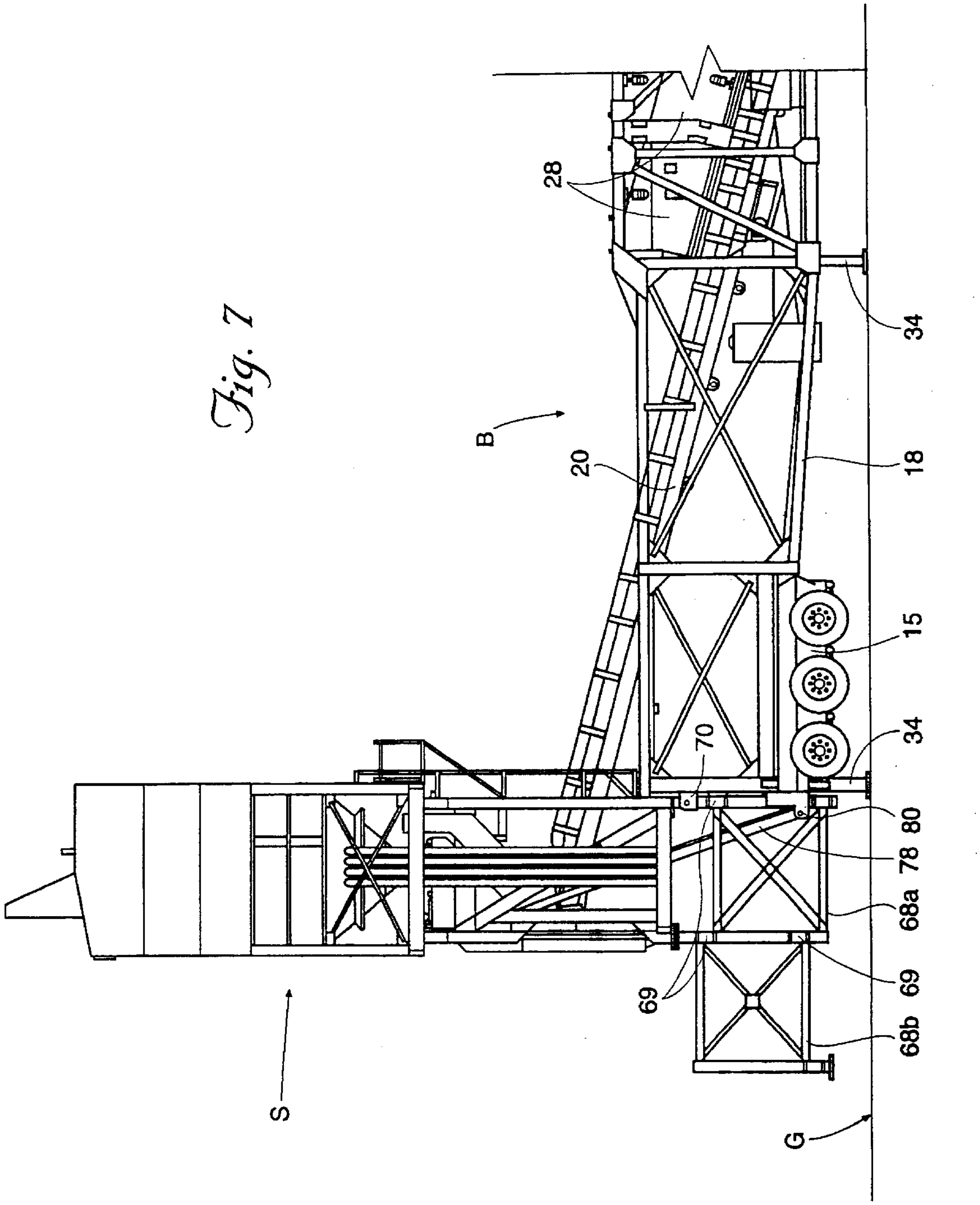
FIG. 7 is a side elevational view of the supporting base unit and tower unit taken after the tower unit has been raised to an upright position and with its outrigger brace member being swung on its hinges outwardly from its storage position beneath the batching tower unit.
Figure 8:
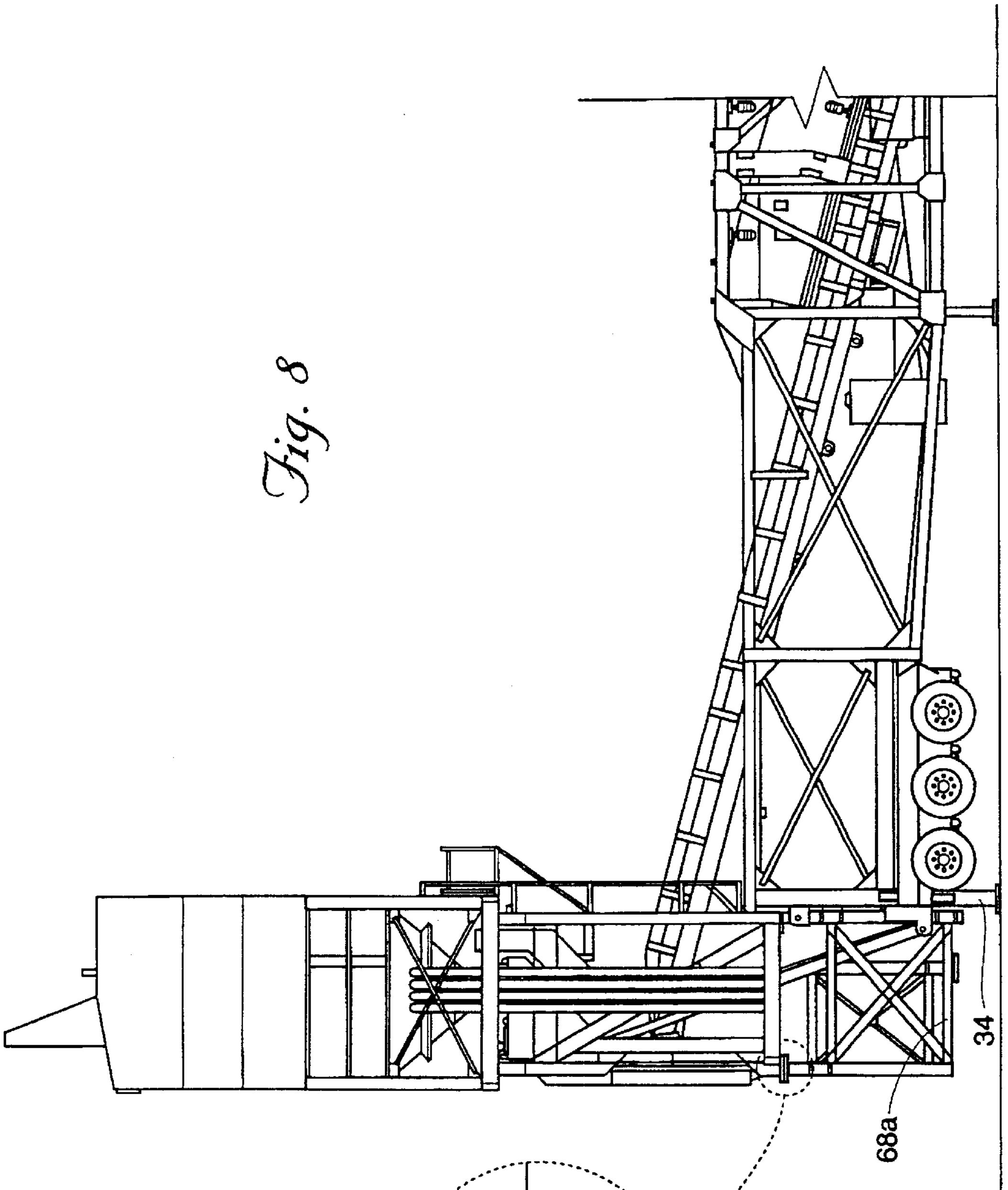
FIG. 8 is a partial side elevational view of the elevated base unit and supported tower unit taken during assembly of the batching plant and just prior to moving its outrigger braces to support position.
Figure 8A:
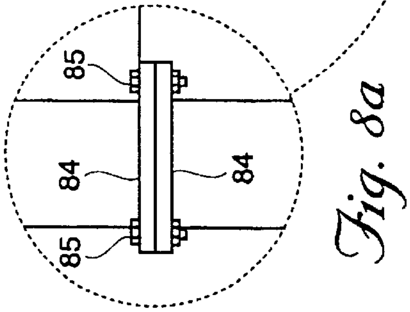
FIG. 8*a* is an enlarged fragmentary and encircled view of the juncture of mating flange members joined as a unit to provide vertical support to a respective leg of the tower unit, and taken just prior to extending the supporting extension of the leg to final resting position.

As disclosed in the view of FIG. 7, after the silo unit S has been raised to its upright position by the extendible rams 78 exerting their respective forces against the stationary clevis menders 80, the support legs 34 of the outrigger X braces 68*a* and 68*b* may be withdrawn upwardly to be released from contact with the ground G. The outrigger components 68*a* and 68*b* are then swung on their respective hinges towards the rear of the supporting base unit B, under the uprighted tower or silo unit S, as shown. Mating flanges 84 are joined together (See FIG. 8*a*) by bolt and nut assemblies 85 to provide a rigid support with the enfolded outriggers 66. The supporting legs 34 of the respective auxiliary X braces 68*a* and 68*b* may then be hydraulically extended to the ultimate supporting position shown in FIG. 11, with the silo unit S and its components resting thereon.

Figure 4A:
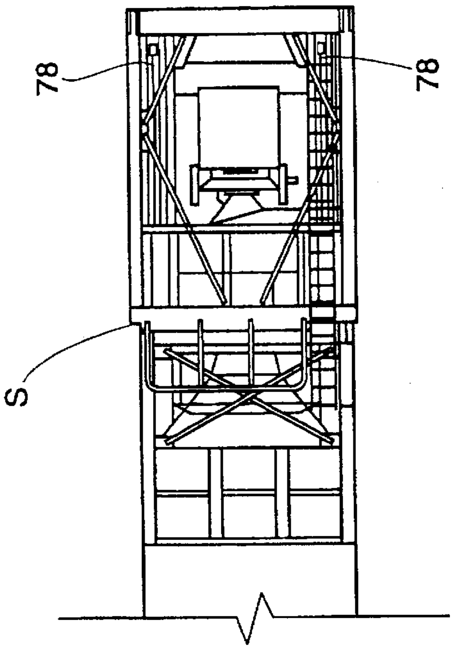
FIG. 4 includes two separate FIGS. 4*a* and 4*b*, wherein 4*a* is a fragmentary top plan view of the rear portion (with respect to the view of FIG. 2) of the rig supporting the cement batch plant tower, or silo.
Figures 5, 5A, 5B:
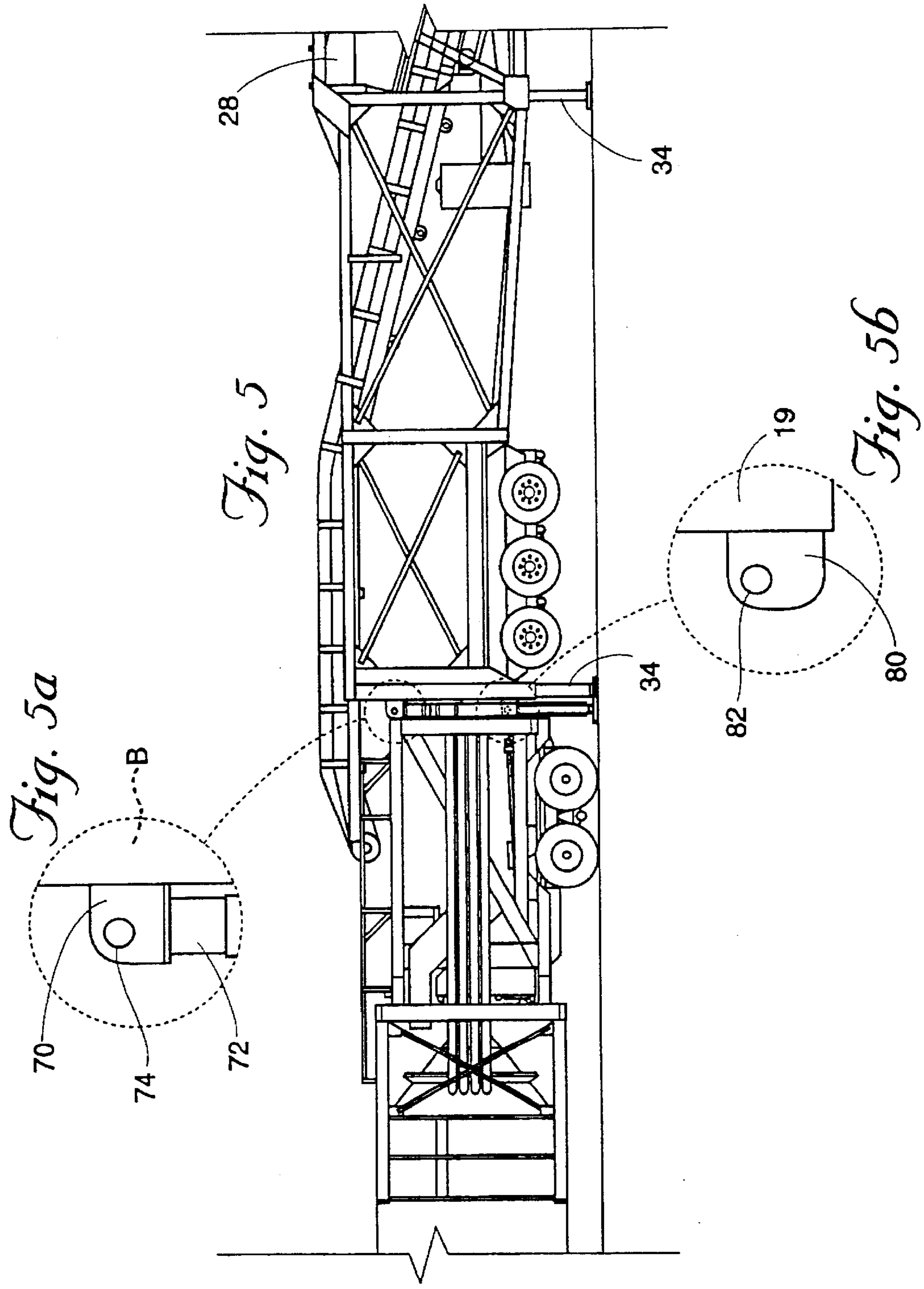
FIG. 5 is a fragmentary side elevational view illustrating the relative positions of the elevated base unit and the supported tower unit during assembly of the batch plant of this invention, and with the bottom upper pair of supporting legs of the tower unit being pivotally attached to the rear of the base unit just prior to self erection of the tower, or silo, unit.
FIGS. 5*a* and 5*b* are each enlarged and encircled views of the respective pivot connection of the uppermost supporting leg of the tower unit and of the rear of the elevated base unit, and of the pivot connection between the distal end of a linear actuator (ram) on the tower unit and its cooperating pivot support on the base unit.
Figure 6:
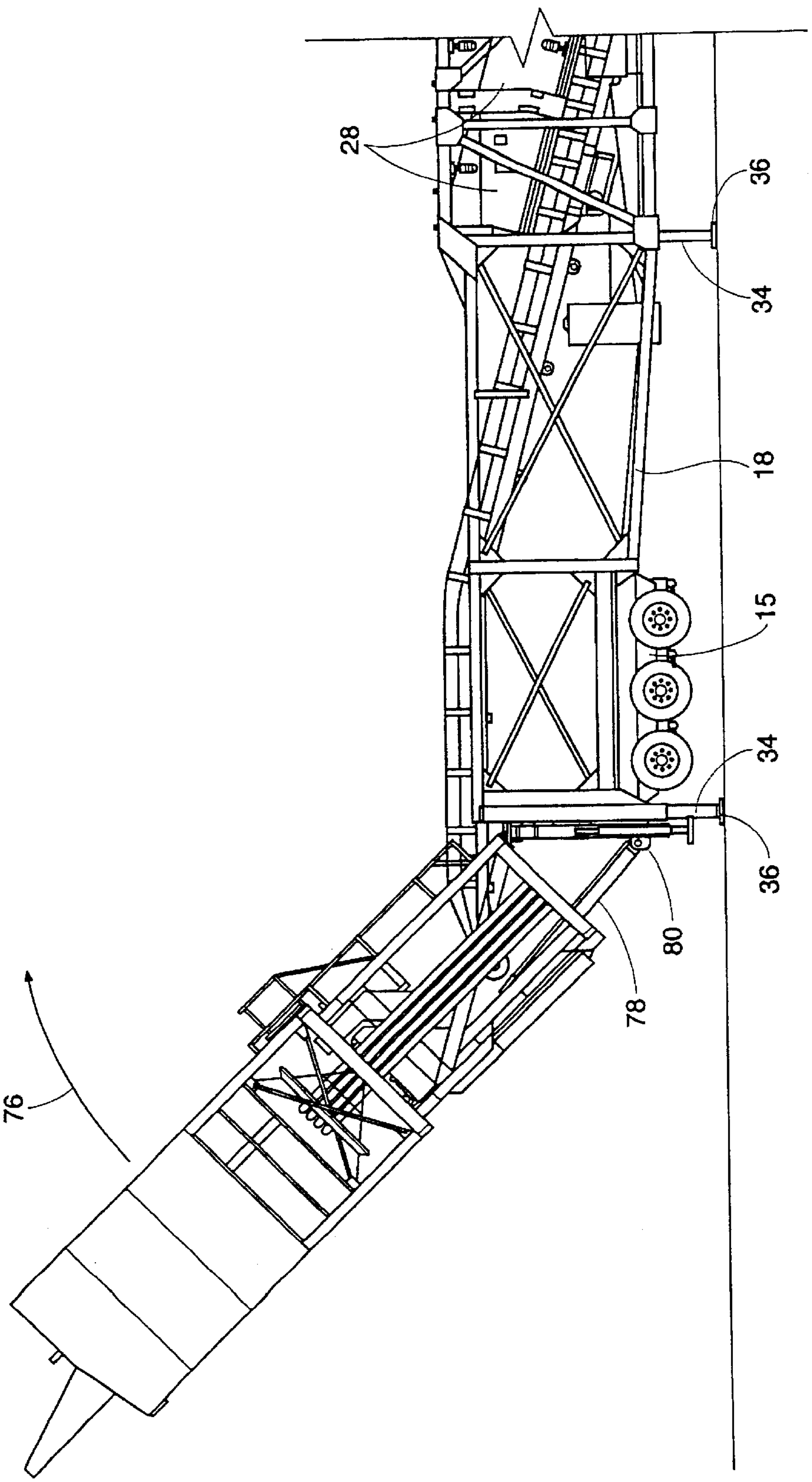
FIG. 6 is a side elevational view of the tower unit and its supporting base unit taken as the tower unit is being raised to its upright position.

As previously described, the conveyor 20 is normally transported in rest position with its distal end portion 22 (see FIG. 1) being supported on a cross beam 19 (see FIG. 4) of the main frame 18, and as shown in the views of FIGS. 1, 5 and 6. The pivotally supported conveyor 20 is raised to its operating position relative to the silo unit S to the operating position shown in FIGS. 7, 8, 10 and 11. The endless belt conveyor 20, in its operating position, provides a means of transferring or conveying pre-weighed aggregate from a bin or bins 26 to the cement batcher 44. It is contemplated that the weight of the coarse and fine aggregate be measured by decumulation from the respective storage bins 26, as opposed to traditional methods of weight measurement that require separate aggregate batcher. In the present case, each of the bins 26 are suspended from spring scales 27 attached at their upper ends to the upper longitudinal frame member 19, and at their lower ends to a respective bin 26. The bin, when fully loaded, will pull the spring-operated scales 27 to extended position, with their respective load pointers (not shown) at the lowermost position. In accordance with this novel decumulation method, as aggregate is removed from a selected bin 26, the pointer will rise to indicate the amount removed.

The novel concrete batch plant, described herein, includes a separate mixer unit M. The mixer unit M is self-supporting, and includes linear-extendible support legs 88, as disclosed in the views of FIGS. 3 and 10. It will be apparent that the support legs 88 are retracted during transportation (See FIG. 3), and are extended to the elevated level shown in FIG. 10 for use in conjunction with the batching process taking place in the erected operating position of the silo unit S, as heretofore described. It is preferred to pivotally mount the mixer 60 at the fulcrum axis 90. This permits the mixer M to be tipped on its axis to ensure proper filling of a concrete supply truck (not shown), whether of the open dumptruck type, or of conventional rotating mixer variety, depending upon job and location requirements. Certain locations are particularly dusty, and concrete mixing and preparation facilities are usually dusty, because of the fine cement and aggregate particles used in the mix. Also, roadwork taking place near more populated locations may require relatively dust-free working environments. In such cases, the present arrangement utilizes a mixer unit M with a transportable, self-contained, dust collection system 64.

It will be apparent that the present invention provides a novel, onsite adjustable, outrigger stabilizer system, including manually foldable, hinged X braces 68*a* and 68*b* comprising the outriggers 66, and which has multiple application for use in locating and parking the supporting base unit B in unfamiliar and uneven terrain, for use in self-erection of the silo unit S, and for support during onsite operation of the assembled base unit B and silo unit S. The system provides an initial lateral supporting position of the hinged outriggers 66 extending from the base supporting unit B to a normal or perpendicular position, or other supporting position, which may be preferred, angularly relative to the longitudinal axis of the base unit B. The outriggers 66 may also be extended to a selected supporting position of either, or both, of the X braces 68*a* and/or 68*b*, acting in concert, to provide ultimate lateral support of the base unit B relative to a selected, but uneven, terrain.

The above-described embodiments of this invention are merely descriptive of its principles and are not to be limited. The scope of this invention instead shall be determined from the scope of the following claims, including their equivalents.

What is claimed is:

1. A mobile, self-erecting concrete batch plant comprising:

a roadway transportable supporting base member unit and a separate roadway transportable cement batching tower unit, said tower unit being arranged for transport in supine position relative to a roadway and to be pivotally attached to said base member unit and rotatably raised to an upright operating position relative to said supporting base member unit;

said cement batching tower unit including tower supporting framework having spaced apart upright members defining a side thereof and having at least one tower lifting ram including one end secured to a respective upright member, said lifting ram including a hydraulically operated, longitudinally extendible, plunger, said plunger having pivot attachment means at the distal end thereof, said tower unit further including a pair of pivot supporting clevis members, each clevis member including coaxial apertures for receiving a pivot pin and being respectively secured to an upright member;

said supporting base member unit including an elongate carriage framework having a forward end including detachable hitching means for transportation thereof, at least one bin for transporting aggregate material, an endless belt conveyor, a plurality of hydraulically operated support legs arranged to lift and support said base member unit to an elevated onsite operating position, a supporting pivot pin and a pair of clevis members extending laterally from said carriage framework and including coaxial apertures arranged for axial alignment with the respective coaxial apertures of the tower supporting clevis members for receiving said supporting pivot pin inserted in said aligned apertures when said base member unit has been raised to elevated operating position, and said base member unit framework further including attachment means spaced from said pivot pin clevis members and arranged for pivotal attachment with the pivot attachment means on said lifting ram plunger during rotation of said tower unit from its supine position to upright operating position.

2. The concrete batch plant of claim 1, wherein said support legs of said base member unit each include a foot pad for resting contact with onsite terrain.

3. The concrete batch plant of claim 1, further including an outrigger lateral support system comprising:

at least one elongated supporting brace structure having a proximal end and a distal end and being hingedly supported at its proximal end on one side of the framework of the base member unit and arranged to be hingedly rotated laterally outwardly relative to said one side of said base member and to a selected support position angularly relative to said base member unit framework, the distal end of said brace structure including a hydraulically operated, extendible supporting leg arranged for extension thereof to supporting contact with onsite terrain for lateral support of said base member unit and said tower unit when fastened to said base member unit.

4. The concrete batch plant of claim 3, wherein the extendible support leg for said brace structure includes a foot pad for resting contact with onsite terrain.

5. The concrete batch plant of claim 3, wherein said outrigger lateral support system includes at least one additional elongated supporting brace structure hingedly supported from the side opposite said one side of the framework of said base member unit member and also having a proximal end and a distal end, and being arranged to be hingedly rotated laterally outwardly to a selected support position angularly relative to the framework of said base unit member, said brace structure also having, at its distal end, a hydraulically operated extendible supporting leg arranged for extension thereof to a supporting contact with onsite terrain for lateral support of the opposite side of said base unit and said tower unit when fastened to said base member unit.

6. The concrete batch plant of claim 3, wherein said outrigger lateral support system includes an additional supporting brace structure having a proximal end and a distal end and being hingedly supported at its proximal end at the distal end of said first mentioned brace structure, and further being arranged to be hingedly rotated angularly relative to said first brace structure and being spaced from said base member unit end including, at its proximal end a hydraulically operated extendible support leg arranged for extension thereof to supporting contact with onsite terrain for further lateral support of said base member unit and said tower unit when fastened to said base member unit.

7. The concrete batch plant of claim 1, further including a separate roadway transportable mixer unit having a plurality of hydraulically operated, longitudinally extendible support legs for raising said mixer unit to an elevated operating position adjacent to said previously erected tower unit, said mixer unit further including a rotatable mixing chamber pivotally mounted relative to said support legs and to said erected tower unit, said pivotally mounted mixing chamber including tilting means for removal of a mixable concrete batch to an awaiting truck.

8. The concrete batch plant of claim 1 wherein said endless belt conveyor includes a proximal end portion and a distal end portion, and wherein said proximal end portion is pivotally supported at the forward end of said base member framework, and wherein said distal end portion of said conveyor normally rests in approximate supine position on the framework of said supporting base member, said conveyor further including means for pivotally raising said distal end of said conveyor to operating position relative to said tower unit when said tower unit has been raised to upright operating position.

* * * * *